US011096098B2

(12) United States Patent
Harmatos et al.

(10) Patent No.: US 11,096,098 B2
(45) Date of Patent: Aug. 17, 2021

(54) METHODS AND APPARATUS FOR HANDOVER CONTROL IN A WIRELESS COMMUNICATION NETWORK

(71) Applicant: Telefonaktiebolaget LM Ericsson (publ), Stockholm (SE)

(72) Inventors: János Harmatos, Budapest (HU); György Miklós, Pilisborosjenö (HU); Attila Mihály, Dunakeszi (HU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 66 days.

(21) Appl. No.: 16/611,055

(22) PCT Filed: May 10, 2017

(86) PCT No.: PCT/IB2017/052739
§ 371 (c)(1),
(2) Date: Nov. 5, 2019

(87) PCT Pub. No.: WO2018/207001
PCT Pub. Date: Nov. 15, 2018

(65) Prior Publication Data
US 2020/0162978 A1    May 21, 2020

(51) Int. Cl.
H04W 36/00    (2009.01)
H04W 36/08    (2009.01)
(Continued)

(52) U.S. Cl.
CPC .......... H04W 36/00837 (2018.08); H04W 36/00835 (2018.08); H04W 36/08 (2013.01); H04W 36/28 (2013.01); H04W 76/11 (2018.02)

(58) Field of Classification Search
None
See application file for complete search history.

(56) References Cited

U.S. PATENT DOCUMENTS

2008/0299974 A1    12/2008  Lee et al.
2011/0211444 A1     9/2011  Das et al.
(Continued)

FOREIGN PATENT DOCUMENTS

WO    2011028954 A1    3/2011
WO    2016095115 A1    6/2016
(Continued)

OTHER PUBLICATIONS

Roome, W, "ALTO Incremental Updates Using Server-Sent Events (SSE) draft-ietf-alto-incr-update-sse-02", ALTO WG; Internet—Draft; Intended status: Standards Track, Apr. 4, 2016, pp. 1-38.
(Continued)

Primary Examiner — Kenny S Lin
(74) Attorney, Agent, or Firm — Murphy, Bilak & Homiller, PLLC

(57) ABSTRACT

A wireless communication network (12) includes one or more control nodes (10) that recognize redundancies between communication modules (14) and control handover of such modules (14) to enforce connection diversity between them and the network (12). Advantageously, the methods and apparatus shown by way of example in this disclosure enforce connection diversity without the need for statically configured diversity schemes that are complex to plan and difficult to maintain.

20 Claims, 7 Drawing Sheets

(51) Int. Cl.
*H04W 76/11* (2018.01)
*H04W 36/28* (2009.01)

(56) References Cited

U.S. PATENT DOCUMENTS

| | | | |
|---|---|---|---|
| 2012/0021744 A1 | 1/2012 | Chin et al. | |
| 2013/0040680 A1 | 2/2013 | Kim et al. | |
| 2013/0260761 A1* | 10/2013 | Walke | H04W 36/0027 455/436 |
| 2014/0092872 A1 | 4/2014 | Rentschler et al. | |
| 2015/0065106 A1 | 3/2015 | Catovic et al. | |
| 2015/0117183 A1 | 4/2015 | Heo et al. | |
| 2016/0020800 A1* | 1/2016 | Krishnamoorthy | H04B 1/707 455/423 |
| 2016/0174232 A1 | 6/2016 | Krishnamoorthy et al. | |

FOREIGN PATENT DOCUMENTS

| | | |
|---|---|---|
| WO | 2017137075 A1 | 8/2017 |
| WO | 2017220124 A1 | 12/2017 |
| WO | 2018207001 A1 | 11/2018 |

OTHER PUBLICATIONS

"Handling requirements for URLLC services with and without cell changes", 3GPP TSG-RAN WG2 Meeting #97; R2-1701863; Athens, Greece, Feb. 13-17, 2017, pp. 1-3.

"Method for In-band Meta-data Transfer", Research Disclosure; The Industry Standard Disclosure Publication Service, Feb. 18, 2016, pp. 1-6.

"PLUS: Path Layer UDP Substrate", Birds of a Feather (BoF) Meeting; IETF-96; Berlin, Jul. 2016, pp. 1-13.

* cited by examiner

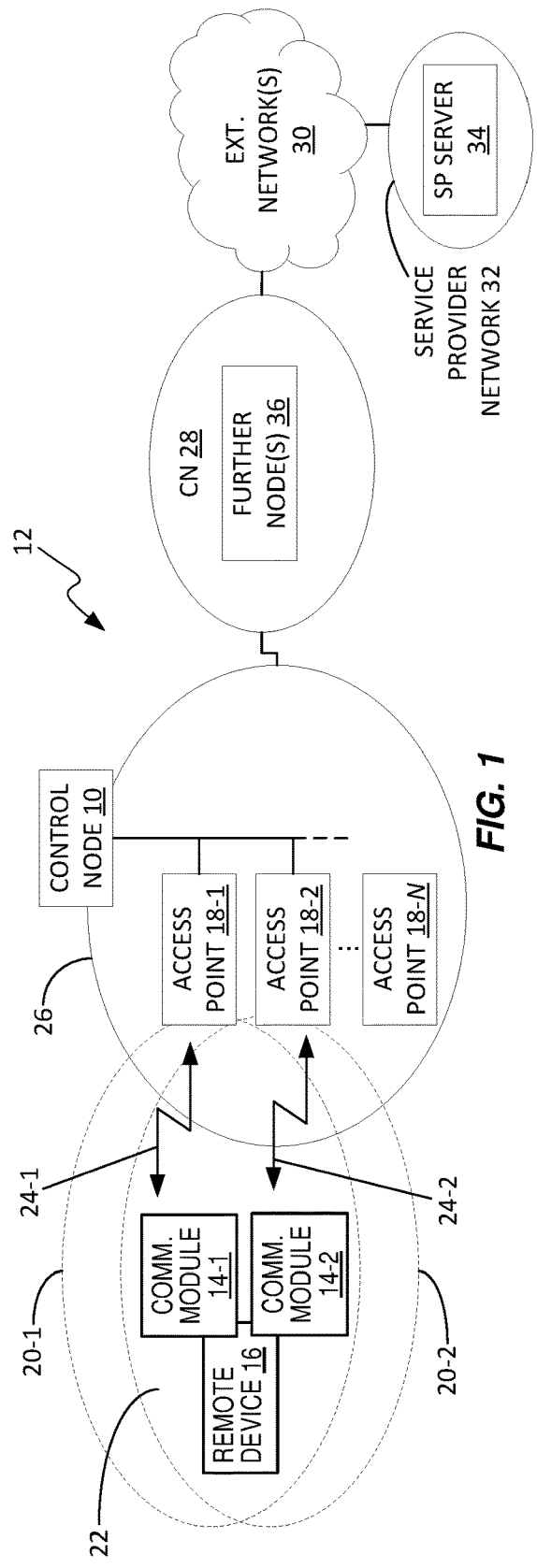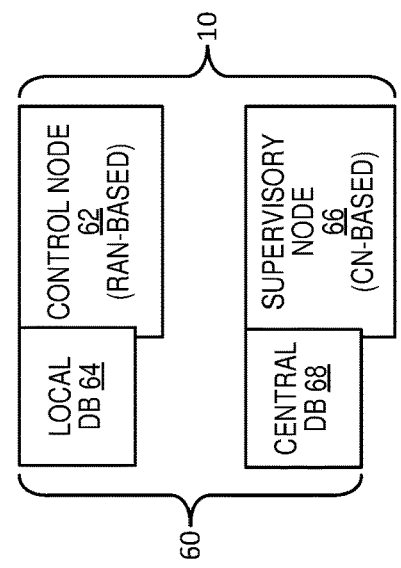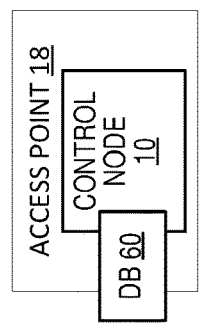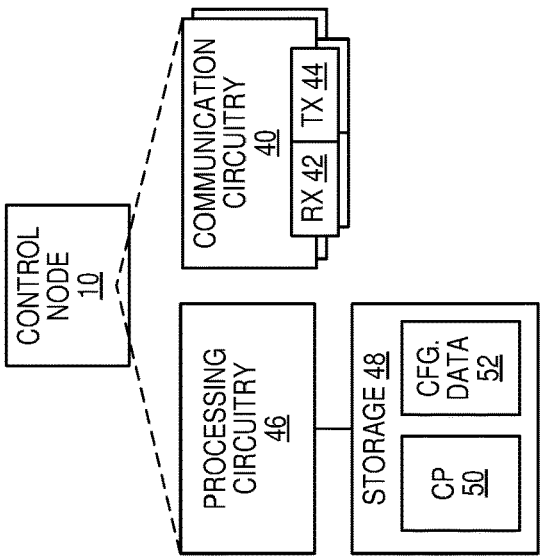

METHODS AND APPARATUS FOR HANDOVER CONTROL IN A WIRELESS COMMUNICATION NETWORK

TECHNICAL FIELD

The present invention relates to wireless communication networks, and to controlling handover of communication modules between access points in a wireless communication network.

BACKGROUND

Wireless communication networks rely on one or more "handover" mechanisms to maintain connectivity with wireless communication devices operating within or among overlapping coverage areas provided by respective radio access points. Evolving network technologies, including developing "5G" or New Radio (NR) provide opportunities for complex coverage scenarios, including extensive use of beamforming between access points and the served devices.

One area of interest involves "critical" devices, where the criticality in question arises from economic or safety considerations. Consider example cases of Machine Type Communication (MTC) devices, which enable wide varieties of services and functions. MTC devices divide into at least two broad classes, a first class characterized by low-cost and low-energy devices deployed in potentially massive numbers, and a second class characterized by mission-critical operations, including real-time control in industrial processes, energy and power systems control, intelligent transportation systems, and the like. Mission-critical MTC, denoted as critical MTC or C-MTC communications requires low latency and high reliability and availability.

Including more than one communication module in a C-MTC device, or otherwise providing more than one communication module for use by a C-MTC device, provides for at least the possibility of good connection redundancy between the C-MTC device and its supporting wireless communication network. For example, the C-MTC device connects to one or more cells of the network using a first one of its associated or embedded communication modules and connects to one or more cells of the network using a second one of its associated or embedded communication modules. The C-MTC device may use both communication modules to carry traffic going between the C-MTC device, or it may treat one of the communication modules as a "reserve" or "backup" module. However, even in the latter case, having such a backup module connected to the network provides for rapid failover from the first communication module.

Using Third Generation Partnership (3GPP) vernacular, the individual communication modules are "User Equipments" or UEs, and each UE may have individual access network credentials or, at least in certain configurations, two or more UEs associated with the same C-MTC device share credentials. Whether one refers to the communication modules as UEs or radio interface circuits, each communication module provides the associated C-MTC with a separate means of wireless connection to the network.

Having two or more communication modules from the same C-MTC device or any "remote device" connected to the same access point in the network comprises the connection redundancy between the device and the network. While it may be necessary under some coverage conditions for communication modules that are redundant to each other to connect to the same access point, they would, preferentially, connect with different access points—an arrangement referred to herein as "connection diversity."

A point appreciated herein, however, is that establishing and maintaining connection diversity for communication modules that are redundant with respect to each other poses appreciable challenges for the network. Particularly, implementing an efficient and dynamically managed approach to enforcing connection diversity for communication modules that are redundant with respect to one another remains an open challenge.

SUMMARY

A wireless communication network includes one or more control nodes that recognize redundancies between communication modules and control handover of such modules to enforce connection diversity between them and the network. Advantageously, the methods and apparatus shown by way of example in this disclosure enforce connection diversity without the need for statically configured diversity schemes that are complex to plan and difficult to maintain.

In an example embodiment, a control node is configured for operation in a wireless communication network and includes communication circuitry and processing circuitry. The communication circuitry is configured for at least one of communicating with communication modules that wirelessly connect to the network, communicating with one or more access points that provide for wireless connection to the network, and communicating with one or more other nodes in the network. Examples of other nodes include other control nodes at the same or a different level in the network, or other types of nodes, such as operations and maintenance nodes.

The processing circuitry is operatively associated with the communication circuitry and is configured to identify redundancies between communication modules. A given communication module is considered redundant with respect to another given communication module when both given communication modules are determined to be affiliated with the same remote device.

The processing circuitry of the control node is further configured to control handover of communication modules to avoid having communication modules that are redundant with respect to each other connected to a same access point in the network. For example, the processing circuitry is configured to control handover based on being configured to perform at least one of the following actions: initiate a handover of one communication module in a given pair of communication modules from a given access point to another given access point, in response to determining that the given pair of communication modules are redundant with respect to each other; and select a given access point as a handover target for a given communication module, based on determining that the given access point is a candidate for serving the given communication module and further based on determining that the given access point is not already serving another given communication module that is redundant with respect to the given communication module.

In another example embodiment, a method of operation at a control node includes identifying redundancies between communication modules. As before, a given communication module is considered redundant with respect to another given communication module when both given communication modules are identified as being affiliated with the same remote device. The method further includes controlling handover of communication modules to avoid having communication modules that are redundant with respect to each other connected to a same access point in the network, at least when avoidance is possible. For example, controlling handover includes at least one of: initiating a handover of one communication module in a given pair of communication modules from a given access point to another given access point, in response to determining that the given pair of communication modules are redundant with respect to each other; and selecting a given access point as a handover target for a given communication module, based on determining that the given access point is a candidate for serving the given communication module and further based on determining that the given access point is not already serving another given communication module that is redundant with respect to the given communication module.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of one embodiment of a wireless communication network.

FIGS. 2-4 are block diagrams of example embodiments of a control node configured for operation in a wireless communication network.

FIG. 5 is a block diagram of one embodiment of an affiliation database containing affiliation information indicating affiliations between respective communication modules and respective remote devices.

DETAILED DESCRIPTION

Figure 7:
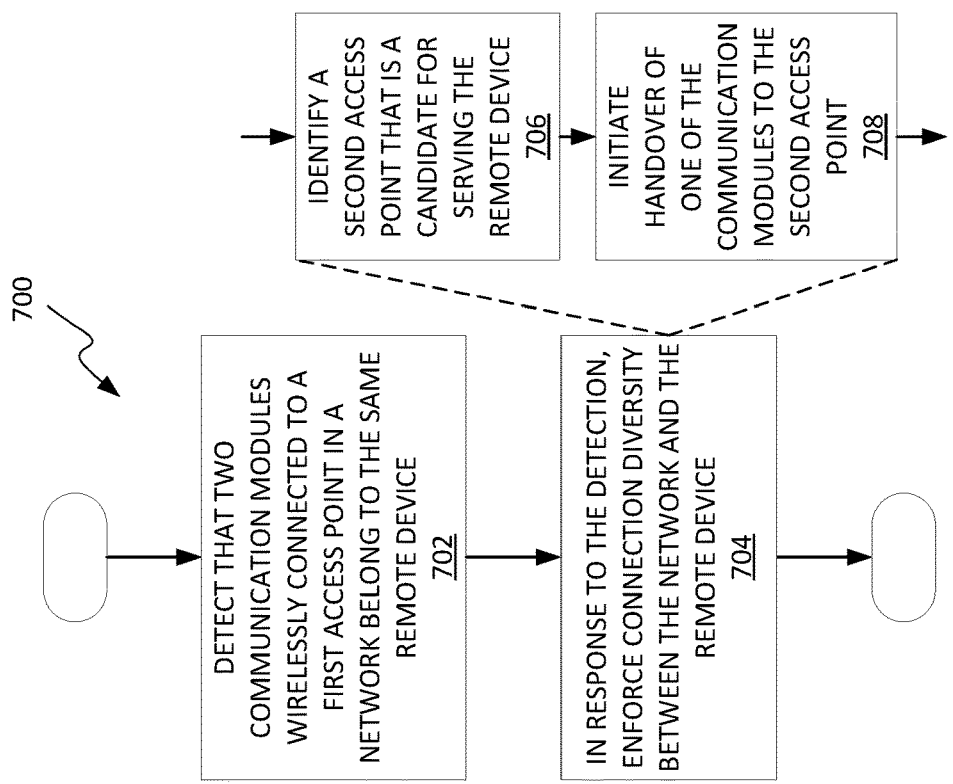
FIGS. 6 and 7 are logic flow diagrams of example embodiments of a method of controlling handover of communication modules between access points in a wireless communication network.

FIG. 1 illustrates an example control node 10 configured for operation within an example wireless communication network 12 ("network 12"). The network 12 comprises, for example, a Fifth Generation (5G) network providing a New Radio (NR) air interface for wirelessly connecting to communication modules (14) served by the network 12. However, the network 12 implement a Radio Access Technology (RAT) other than NR, or in addition to NR, and other alternatives or additions include Fourth Generation (4G) implementations, popularly known as Long Term Evolution (LTE). Further, while network 12 in one or more embodiments operates according to Third Generation Partnership Project (3GPP) specifications, the techniques disclosed herein have broader applicability.

Similarly, the communication modules 14 may be User Equipments (UEs) within the meaning used in 3GPP technical specifications, but they should be understood broadly as comprising cellular modems or, more generally, radio interfaces that communicatively couple an associated remote device 16 to the network 12 via an air interface or interfaces. The communication modules 14, therefore, may be provisioned with subscriber or other credentials by which they are authenticated for access to the network 12 and tracked for billing, etc.

While the diagram illustrates one remote device 16 that is "affiliated" with two communication modules 14-1 and 14-2, there may be a potentially large and dynamically fluctuating number of remote devices 16. Some or all such devices 16 each may include more than one communication module 14 for redundantly connecting to the network 12. The word "device" at least when used in the term "remote device" may refer to a complex subassembly, assembly, or system, and the word "remote" indicates a wireless connection to the network 12.

By way of example, the depicted remote device 16 comprises a vehicle or other assembly that uses the network 12 for critical communications involving public safety or other high stakes application. Because of the need for uninterrupted availability and high reliability of communications between the remote device 16 and the network 12, the remote device 16 includes or otherwise uses two or more communication modules 14 for redundantly connecting to the network 12, shown here as 14-1 and 14-2. There may be multiple and varied remote devices 16 connecting to the network 12 at various times and any of them may use two or more communication modules 14 for redundantly connecting to the network 12.

In other details, the network 12 includes one or more access points 18, with 18-1 through 18-N depicted by way of example. Each access point 18 provides a corresponding cell or coverage area 20, e.g., the access point 18-1 provides a cell or coverage area 20-1, the access point 18-2 provides a cell or coverage area 20-2, and so on. The respective coverage areas provided by two or more geographically neighboring access points 18 may overlap, thereby forming an overlapping coverage area 22. A remote device 16 operating in an overlapping coverage area 22 may experience good or at least sufficient signal strength with respect to more than one access point 18, meaning that there is some discretion in controlling which access point or points 18 serve the remote device 16. Here, unless a more specific meaning appears in context, the term "serve" does not necessarily denote the active exchange of user traffic, but does connote the ability to establish a connection—radio link—of sufficient quality with the remote device 16.

Another aspect worth qualifying involves the term "cell" or "coverage area." The terms as used herein are not limited to older, conventional definitions involving fixed geographic areas and fixed radio resource assignments. 5G and other networks provide steered and dynamically adjustable coverage via beamforming, for example. Further, the cells or coverage areas 20 are not necessarily the same size, e.g., there may be macro or large coverage areas overlaid by pico or small coverage areas. Correspondingly, the access points 18 are not necessarily all the same type, power, or coverage capabilities and the different coverage areas 20 may involve the same or different Radio Access Technologies (RATs), or at least different frequencies.

For illustration simplicity, the various access points 18 appear within one Radio Access Network (RAN) 26, but there may be multiple RANs, e.g., associated with different RATs, with direct or indirect interworking between the access points 18 in different RANs. Other elements or components in the example network 12 include a Core Network (CN) 28 that communicatively couples to one or more external networks 30. Example external networks 30 include the Internet or other packet data networks. In one or more example cases, a Service Provider (SP) network 32 includes one or more SP servers 34 that provide services accessed by the remote device 16 via the network 12. That is, the remote device 16 and the SP server(s) 34 may operate as respective endpoints for user traffic conveyed through the network 12. Merely as an example, the SP server(s) 34 provide one or more Machine Type Communication (MTC) services, and the remote device 16 comprises an MTC device that uses the communication modules 14-1 and 14-2 for redundantly connecting to the network 12. In one or more examples, the remote device 16 comprises a Critical MTC (C-MTC) device and relies on its two communication modules 14-1 and 14-2 for maintaining connectivity with the network 12.

The control node 10 controls handover of communication modules 14 in the network 12, although that description must be understood as meaning that the control node 10 controls handover to or from at least one coverage area or cell 20 in the network. There may be multiple control nodes 10 operating as peers, e.g., each associated with a respective access point 18 or a respective group of access points 18. An alternative approach uses a hierarchical implementation of the control node 10, e.g., with some functionality implemented in the RAN 26 and some functionality implemented in the CN 28. In one example, the CN-level functionality provides supervisory support for the RAN-level functionality.

FIG. 2 illustrates an example embodiment of a control node 10. Various elements or components constitute the control node 10, including communication circuitry 40, which may include one or more receiver (RX) circuits 42 and one or more transmitter (TX) circuits 44. Circuit details for the communication circuitry 40 depend on where the control node 10 resides within the network 12 and on the implementation of the handover control scheme. In one or more examples, each of one or more access points 18 in the network 12 incorporate functionalities constituting a control node 10. Thus, the communication circuitry 40 may be shared with the access point 18 and include inter-access-point communication circuits, such as the circuitry included in Long Term Evolution (LTE) base stations (eNodeBs) for the "X2" interface. Additionally, or as an alternative, the communication circuitry 40 corresponds to the "S1-MME" interface used to communicatively couple eNodeBs to respective Mobility Management Entities (MMEs) in the System Architecture Evolution (SAE) core used in LTE networks.

In other example embodiments, the control node exists separately from any access point 18, although it may be co-located with and support a particular access point 18 or a particular group of access points 18. In such embodiments, the communication circuitry 40 includes circuitry, such as Ethernet or other computer network interface circuitry, for communicative coupling to one or more access points 18, e.g., for effectuating handover control and exchanging supporting information. The communication circuitry 40 in at least one such embodiment includes inter-control-node interface circuitry configured for wireless or, preferably, wired, connections between peer control nodes 10. Still further, in embodiments that involve centralized handover control functionality in the CN 28, the communication circuitry 40 in a given control node 10 includes circuitry for interfacing with a supervisory node in the CN 28. Alternatively, the control node 10 exploits preexisting communicative coupling between the access points 18 and the CN 28 for such communications.

Other entities or components in the depicted control node 10 include processing circuitry 46, which includes or is associated with storage 48. The processing circuitry 46 comprises fixed circuitry, or preprogrammed circuitry, or programmable circuitry, or any combination of fixed, preprogrammed, and programmable circuitry. Non-limiting examples include one or more microprocessors, microcontrollers, Digital Signal Processors (DSPs), Field Programmable Gate Arrays (FPGAs), Complex Programmable Logic Devices (CPLDs), Application Specific Integrated Circuits (ASICS), or essentially any other arrangement of digital processing circuitry, such as combinational digital logic, sequential digital logic, or both.

In at least one example, the processing circuitry 46 comprises one or more processors—e.g., microprocessors—that are specially adapted to perform the operations described herein based on executing computer program instructions from one or more computer programs stored in a computer-readable medium providing non-transitory storage for the computer program(s). "Non-transitory" does not necessarily mean unchanging but does connote at least some persistence, and various types of computer-readable media may be involved, such as a mix of non-volatile memory for long-term storage of the computer program(s) and volatile memory as working memory for program execution and scratch data.

Correspondingly, in one or more embodiments, the storage 48 stores one or more computer programs 50 comprising computer program instructions the execution of which by one or more processors realizes or implements the processing circuitry 46. The storage 48 may further store one or more items of configuration data 52, based on receiving it during live operation or based on it being pre-stored. The configuration data 52 comprises, for example, information regarding the identities of communication modules 14 connected to one or more particular access points 18, lists of neighboring access points 18, and/or affiliation information indicating affiliations between respective communication modules 14 and respective remote devices 16. In one or more embodiments, affiliation information resides in one or more affiliation databases 60, such as seen in FIGS. 3-5.

FIG. 3 illustrates a control node 10 integrated within a given access point 18. The control node 10 maintains or has access to an affiliation database 60. In some embodiments, the affiliation database 60 serves as the mechanism for identifying redundancies between communication modules 14—i.e., for identifying when two or more communication modules 14 are affiliated with the same remote device 16 and should, therefore, be subject to handover control that aims for enforcing connection diversity between the network 12 and the remote device 16.

FIG. 4 illustrates another example embodiment where a control node 10 provides handover control for more than one access point 18. The control node 10 depicted in FIG. 4 operates "centrally" with respect to the access points 18-1 through 18-N, where N is an integer greater than one. The affiliation database 60 shown in FIG. 4 may contain affiliation information of interest to multiple access points 18, whereas the affiliation database 60 shown in FIG. 3 may be localized to one access point 18—although it may still include information relevant at least to the immediately neighboring access points 18.

FIG. 5 illustrates yet another contemplated arrangement for a control node 10, wherein the control node 10 comprises one or more RAN-based control nodes 62 and at least one CN-based supervisory node 66. For example, each access point 18 includes or is associated with a RAN-based control node 62, and at least one CN-based supervisory node 66 supports them. Here, the term "supervisory" is used loosely, because some embodiments contemplate active, ongoing supervision, while other embodiments contemplate more of a supporting role for the supervisory node 66. In one such example, the supervisory node 66 maintains a central database 68 that includes affiliation information for a potentially large number of remote devices 16, and provides such information, e.g., upon request or as needed or relevant, to respective RAN-based control nodes 62 in the RAN 26. Each such RAN-based node 62 maintains a respective local affiliation database 64.

In one example, a network operator or an automated provisioning system "loads" the central affiliation database 68 with affiliation information that indicates affiliations between respective communication modules 14 and respective remote devices 16. For example, the SP associated with the SP network 32 may assign each remote device 16 with a unique identifier, a serial number or the like, and each communication module 14 necessarily has some type of unique identifier used by the network 12 for recognizing and/or authenticating the communication module 14. Non-limiting examples include International Mobile Subscriber Identities or IMSIs, Mobile Identification Numbers or MINs, International Mobile Equipment Identifier or IMEI, Mobile Subscriber Integrated Services Digital Network numbers or MSISDNs, Medium Access Control (MAC) addresses, etc.

In an example case, a RAN-based control node 62 obtains the communication module identifier of a given communication module 14, e.g., based on the communication module 14 providing it to the network 12 when connecting or re-connecting to the network 12. The control node 62 uses the communication module identifier to access—directly or indirectly—the central affiliation database 68, for retrieval of the remote device identifier, if any, that is affiliated with the communication module 14. Adding the retrieved affiliation information to the local affiliation database 64 allows the control node 62 to identify redundancies between the communication module 14 and any other communication module 14 represented in the local affiliation database 64 or represented in the local affiliation database 64 of any neighboring control nodes 10.

In other instances, or in other embodiments, the communication modules 14 provide their communication module identifiers and the remote device identifier of the remote device 16 they are affiliated with, in conjunction with connecting to the network 12. Such information and the indicated affiliations can be captured and recorded in an affiliation database 60—regardless of whether that database exists as a central database, or as distributed databases possibly supported by a central database.

Of course, some types of communication modules may report remote device affiliations and some may not. Further, the network 12 may support communication modules 14 that are standalone or otherwise unaffiliated with any remote device 16. Thus, a mix of the above-described operations, capabilities, and deployments may be used in the network 12. For example, the control node 10 may recognize certain categories of communication modules 14 as being used for connecting remote devices 16 or may recognize certain values or ranges of communication module identifiers as identifying communication modules 14 used for connecting remote devices 16. As an alternative, the control node 10 may interpret the lack of affiliation information in the affiliation database 60 for a given communication module identifier as an indication that the corresponding communication module 14 is not affiliated with a remote device 16.

Keeping the described range of variations and possibilities in mind, in one or more embodiments, a control node 10 is configured for operation in a wireless communication network 12 and comprises communication circuitry 40 and processing circuitry 46. The communication circuitry 40 is configured for at least one of: communicating with communication modules 14 that wirelessly connect to the network 12, communicating with one or more access points 18 in the network 12 that provide for wireless connection to the network 12, and communicating with one or more other nodes 36 in the network 12.

The processing circuitry 46 is operatively associated with the communication circuitry 40 and configured to identify redundancies between communication modules 14. A given communication module 14 is considered redundant with respect to another given communication module 14 when both given communication modules 14 are identified as being affiliated with the same remote device 16.

The processing circuitry 46 is further configured to control handover of communication modules 14 to avoid having communication modules 14 that are redundant with respect to each other connected to the same access point 18 in the network 12. For example, the processing circuitry 46 is configured to control handover based on being configured to perform at least one of the following actions: initiate a handover of one communication module 14 in a given pair of communication modules 14 from a given access point 18 to another given access point 18, in response to determining that the given pair of communication modules 14 are redundant with respect to each other; and select a given access point 18 as a handover target for a given communication module 14, based on determining that the given access point 18 is a candidate for serving the given communication module 14 and further based on determining that the given access point 18 is not already serving another given communication module 14 that is redundant with respect to the given communication module 14.

The processing circuitry 46 may also be configured to include in its handover control mechanisms to avoid or recover from radio link failure (RLF). For example, it may allow two or more communication modules 14 that are redundant with respect to each other to be served from or handed over to the same access point 18, in cases where it is not possible to enforce connection diversity—e.g., lack of choices in terms of radio coverage.

Here, "handover" may be understood as transferring the radio connection of a communication module 14 from one access point 18 to another. The term contemplates various forms of handover, including "soft" handover where the communication module 14 remains connected to both the "source" access point 18 from which it is being handed over and the "target" access point 18 receiving the communication module 14 in handover.

In an example, the processing circuitry 46 is configured to control handover of communication modules 14 by being configured to, for a given communication module 14 targeted for handover from a given access point 18, identify a neighboring access point 18 that is a candidate for receiving the given communication module 14 in handover and is not already serving another communication module 14 that is redundant with respect to the given communication module 14. The given access point 18 may be one that is associated with the control node 10 in question and the neighboring access point 18 may be a candidate for receiving the given communication module 14 in handover because it offers sufficient received signal strength at the given communication module 14. Individual communication modules 14 may report signal quality measurements to the network 12 on a periodic or commanded basis. The measurement reports from a given communication module 14 include, for example, measurements for its serving access point(s) 18 and at least one neighboring access point 18.

In another example, the processing circuitry 46 is configured to control handover of communication modules 14 by being configured to, after handover of a given communication module 14 from a given access point 18 to another given access point 18 and while the given communication module 14 remains connected to the other given access point 18, prevent or delay subsequent handover to the other given access point 18 of any communication module 14 that is redundant with respect to the given communication module 14. Such operations may rely on, for example, the exchange of information between access points 18 or control nodes 10 regarding which communication modules 14 are connected to which access points 18, along with disconnection or subsequent handover-event information. In one specific example, handover events involving communication modules 14 that have redundancies may be flagged or carry further information. The flagging or further information causes the target access point 18 or its associated control node 10 to report back to the source access point or its associated control node 10 whenever such a communication module 14 later disconnects from the target access point 18.

Another example involves a "first" communication module 14-1 identified as being redundant with respect to a "second" communication module 14-2. Here, "first" and "second" serve as labels of convenience. The processing circuitry 46 is configured to avoid handing over one of the first and second communication modules 14-1, 14-2 to any access point 18 that is connected to the other one of the first and second communication modules 14-1, 14-2, if handover is not needed to avoid or recover from a radio link failure.

Communication module identifiers identify corresponding communication modules 14 and remote device identifiers identify corresponding remote devices, at least in the context of some embodiments. In at least one such embodiment, the processing circuitry 46 is configured to identify redundancies between communication modules 14 by being configured to recognize when two or more communication module identifiers are affiliated with a same remote device identifier.

To identify redundancy between first and second communication modules 14-1 and 14-2, the processing circuitry 46 in one or more embodiments is configured to obtain the corresponding communication module identifiers and determine whether the corresponding communication module identifiers are affiliated with a same remote device identifier. For example, the processing circuitry 46 is configured to obtain the corresponding communication module identifiers directly or indirectly from the first and second communication modules 14-1, 14-2, and obtain affiliation information from an affiliation database 60 that indicates whether the corresponding communication module identifiers are affiliated with the same remote device identifier.

As noted, the processing circuitry 46 in some embodiments is configured to maintain an affiliation database 60 indicating affiliations between respective communication modules 14 and respective remote devices 16. Such a database may contain information relevant to one or more particular access points 18, and the network 12 may include more than one such database, or the database may include affiliation information of relevance to the network at large.

In more detail, in at least some embodiments, the processing circuitry 46 is configured to maintain an affiliation database 60 by being configured to maintain at least one of: one or more local affiliation databases 64, each local affiliation database 64 being local to a particular access point 18 in the network 12 or a particular group of neighboring access points 18 in the network 12; and a central affiliation database 68 that is not localized to any particular access point 18 in the network 12 or any particular group of access points 18 in the network 12.

The database arrangement depends on the implementation architecture adopted for the control node(s) 10. In an example, a control node 10 comprises a RAN based control node 62 that is integrated into or associated with one or more access points 18 in the network 12. The control node 10 may further comprise a CN based supervisory node 64 that is configured to operate in a supervisory capacity with respect to the RAN based node 62. In at least one such embodiment, the RAN based control node 62 maintains the one or more local affiliation databases 64 based on communication module identifiers received from given communication modules 14 connecting to access points 18 associated with the control node 62. The control node 62 also may obtain affiliation information from the central affiliation database 68.

In a simple example, a control node 10 may control handovers only for a particular access point 18 or a particular group of access points 18 from the "source" perspective. Thus, the control node 10 avoids handover targets that would result in two communication modules 14 that are redundant with respect to one another from being connected to the same access point 18. In a logically inverse embodiment, a given control node 10 may be configured to operate from the handover target perspective and refuse handover, at least when possible, for any communication module 14 that is redundant with respect to any other communication module 14 already connected to the target access point 18. Further, respective control nodes 10 associated with respective, neighboring access points 18 may carry out the desired handover control cooperatively.

In these and other example embodiments, new protocols and new signaling may be defined for conveyance directly between control nodes 10, or indirectly via the involved access points 18. Alternatively, existing handover control signaling protocols provide for the conveyance of certain information between source and target access points transparently, via so-called "containers" and control nodes 10 may make use of such information to add additional flags or Information Elements (IEs) to handover control signaling.

Figure 6:
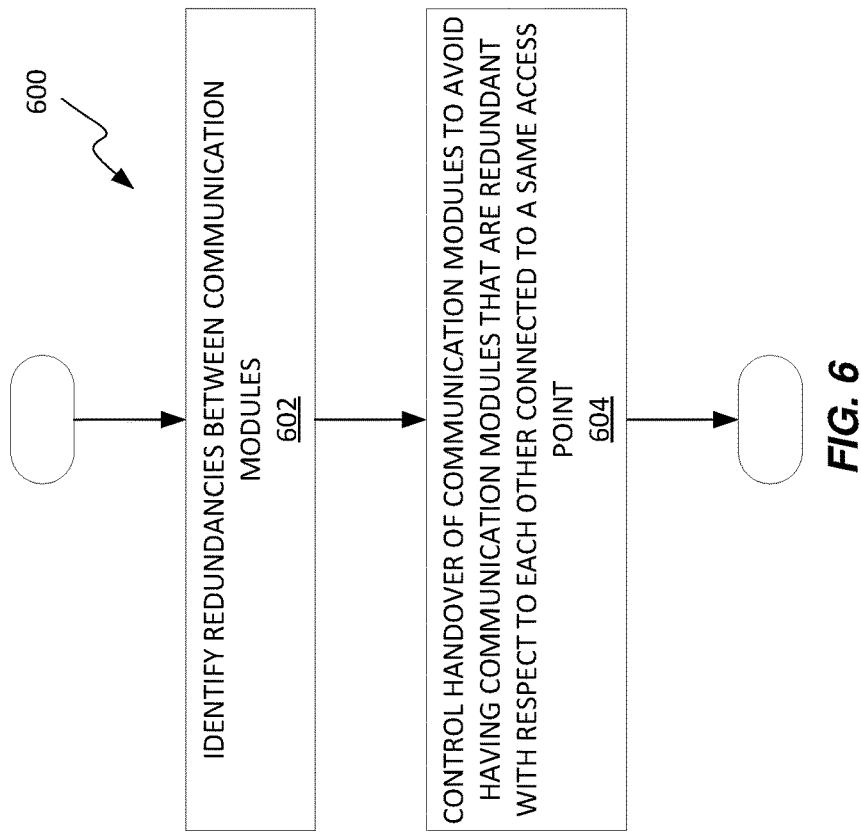

FIG. 6 depicts a method 600 of operation at a control node 10 configured for operation in a network 12. While the control node 10 depicted in any of FIGS. 1-5 may implement the method 600, the method 600 is not limited to implementation in a particular control node arrangement or architecture. Moreover, the steps or operations depicted in FIG. 6 may be implemented in an order other than the one suggested, or, the method 600 may be understood as an ongoing process happening at different times or executing in different instances for any number of communication modules 14.

The method 600 includes identifying (Block 602) redundancies between communication modules 14, where a given communication module 14 is considered to be redundant with respect to another given communication module 14 when both given communication modules 14 are identified as being affiliated with the same remote device 16. The method 600 further includes controlling (Block 604) handover of communication modules 14 to avoid having communication modules 14 that are redundant with respect to each other connected to a same access point 18 in the network 12, at least when avoidance is possible.

As an example, the control processing of Block 604 comprises at least one of the following actions: initiating a handover of one communication module 14 in a given pair of communication modules 14 from a given access point 18 to another given access point 18, in response to determining that the given pair of communication modules 14 are redundant with respect to each other; and selecting a given access point 18 as a handover target for a given communication module 14, based on determining that the given access point 18 is a candidate for serving the given communication module 14 and further based on determining that the given access point 18 is not already serving another given communication module 14 that is redundant with respect to the given communication module 14. Here, the given access point 18 may be identified as a "candidate" for serving the given communication module 14 based on determining that signal quality or strength reported by the given communication module 14 for the given access point 18 at least satisfies some minimum defined threshold.

FIG. 7 illustrates a further method 700, which may be considered as an addition to the method 600, or further detailed operations carried in during the method 600, in one or more embodiments. The same qualifiers and variations noted for the method 600 also apply in the context of the method 700.

Steps or operations in the method 700 include a control node 10 detecting (Block 702) that two communication modules 14-1 and 14-2 wirelessly connected to a first access point 18-1 in the network 12 belong to the same remote device 16. Here, "belong to" and "affiliated with" interchangeably indicate an association between a communication module 14 and a remote device 16.

The method 700 further includes, in response to the detection in Block 702, the control node 10 enforcing (Block 704) connection diversity between the network 12 and the remote device 16. For example, the control node 10 identifies (Block 706) a second access point 18-2 in the network 12 that is a candidate for serving the remote device 16, and initiates (Block 708) handover of one of the communication modules 14-1 and 14-2 to the second access point 18-2. In this example, identifying the second access point 18-2 as a candidate includes verifying that it is not already connected with another communication module 14 that belongs to the same remote device 16 that the modules 14-1 and 14-2 belong to. In other uses herein, determining that an access point 18 is a "candidate" for targeting in a handover operation refers to its suitability from a radio connection and network conditions perspective, and the check for redundancies stands as a separate operation.

Figure 8:
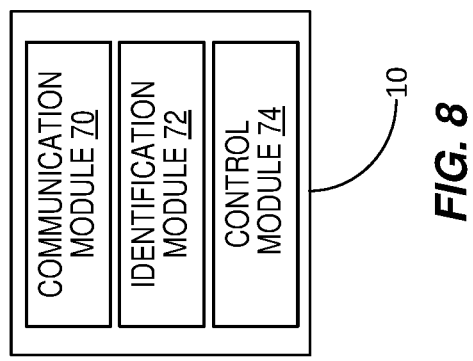
FIG. 8 is a block diagram of one embodiment of processing or functional modules implemented in one or more control nodes, for controlling handover of communication modules between access points in a wireless communication network.
Figure 9:
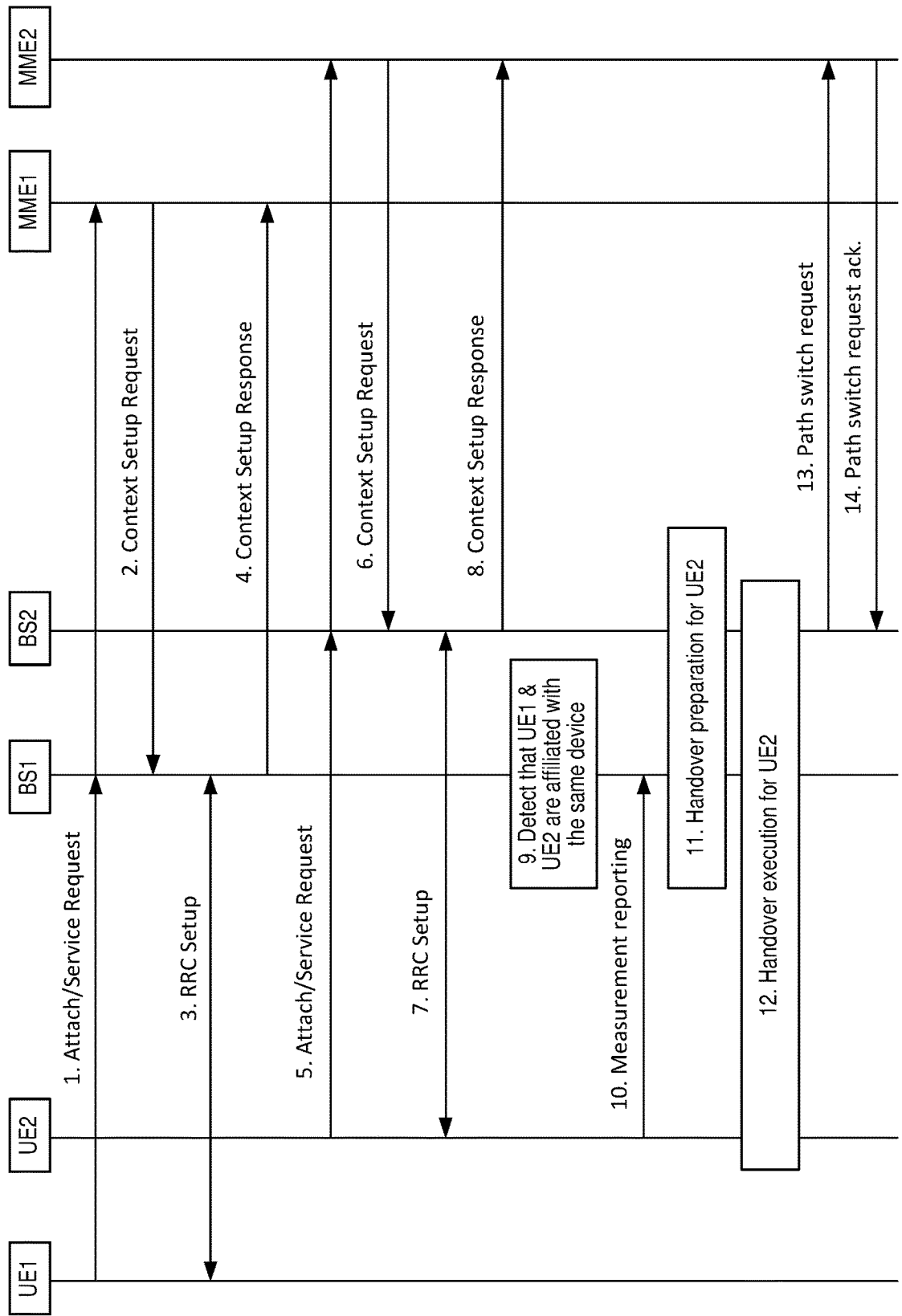
FIGS. 9-12 are signal flow diagrams of example embodiments of controlling handover of communication modules between access points in a wireless communication network.

FIG. 8 illustrates various modules that may be implemented within a control node 10 to carry out the operations disclosed herein. In the context of FIG. 8, use of the term "module" distinguishes from its use for the communication modules 14. The communication modules 14 represent physical radio communication circuits and supporting logic, whereas the "modules" depicted in FIG. 8 may be virtualized modules implemented, e.g., in a run-time environment of one or more computer processors.

The control node 10 includes a communication module 70 for exchanging communications or signaling, as needed, for controlling handovers involving one or more access points 18. The control node 10 further includes an identification module 72 for identifying redundancies between communication modules 14, i.e., for identifying communication modules 14 that belong to the same remote device 16. Further, the control node 10 includes a control module 74 for controlling handovers to avoid two communication modules 14 belonging to the same remote device 16 from being connected to the same access point 18. The Thus, in one or more embodiments detailed herein, the network 12 identifies and tracks the different communication modules 14 that belong to the same remote device 16, and controls handover of those communication modules 14 to enforce connection diversity between the remote device 16 and the network 12. Specifically, when possible, the network 12 avoids having more than communication module 14 belonging to the same remote device 16 from being connected—or, at least, from remaining connected—to the same access point 18. A remote device identifier assigned to the remote device 16 may be associated with all communication modules 14 that belong to the remote device 16, and the network 12 determines which communication modules 14 belong to which remote devices 16 based on configured or dynamically acquired affiliation information that links communication module identifiers to remote device identifiers.

In another embodiment, a computer program product—e.g., the computer program 50 denoted as "CP" in FIG. 1—comprises computer instructions that, when executed by processing circuitry 46 of a control node 10 configured for operation in a wireless communication network 12, cause the control node 10 to communicate with at least one of: communication modules 14 that wirelessly connect to the network 12; one or more access points 18 that provide for wireless connection to the network 12; and one or more other nodes 36 in the network 12. The computer instructions further cause the control node 10 to identify redundancies between communication modules 14, and control handover of communication modules 14 to avoid having communication modules 14 that are redundant with respect to each other connected to a same access point 18 in the network 12. The handover control includes, for example, at least one of: initiating a handover of one communication module 14 in a given pair of communication modules 14 from a given access point 18 to another given access point 18, in response to determining that the given pair of communication modules 14 are redundant with respect to each other; and selecting a given access point 18 as a handover target for a given communication module 14, based on determining that the given access point 18 is a candidate for serving the given communication module 14 and further based on determining that the given access point 18 is not already serving another given communication module 14 that is redundant with respect to the given communication module 14.

In another embodiment, a control node 10 is configured for operation in a wireless communication network 12, and is further configured to: identify redundancies between communication modules 14, as described elsewhere in this disclosure, and to control handover of communication modules 14 to avoid having communication modules 14 that are redundant with respect to each other connected to a same access point 18 in the network 12. The handover control may be performed as described elsewhere in this disclosure.

The contemplated techniques provide for reliable connectivity of C-MTC devices and do not require pre-configured or static "reliability" groups. Preconfigured grouping assigns the communication modules belonging to a remote device to different reliability groups, and the communication modules connect with or are handed over to access points having the same reliability group membership. In contrast, the coordinated management of communication modules 14 provided by the disclosed techniques obviates the need for configuring and maintaining reliability group designations, and the increasing proliferation of densely populated access points 18 amplifies the importance of these advantages.

Notably, enforcing redundancy on a per-device/per module basis offers a finer level of connectivity optimization and can result in better utilization of network resources, while simultaneously providing higher connection reliabilities. Moreover, the disclosed techniques automatically adapt to changing network conditions.

Earlier descriptions indicated significant flexibility regarding the communication module identifiers and the remote device identifiers, regarding which identifiers are used and how they are obtained by the network 12. In addition to the earlier examples of communication module identifiers, example remote device identifiers include the standard identifiers used in PROFINET, which is a recognized industrial variant of ETHERNET. PROFINET identifiers comprise two fields, one unique to a device manufacturer and one unique to the device or device category, at least within the domain of the identified manufacturer. In this respect, anything used as a remote device identifier within the network 12 should be unique within the applicable network scope.

The network 12, e.g., a control node 10 within the network 12, obtains remote device identifiers by any one or more mechanisms. In one example, a Home Subscriber Server (HSS) or other entity in the network 12 maintains subscriber data that links remote device identifiers to respective communication module identifiers, where the communication module identifiers correspond to communication modules 14 that are authorized for access to the network 12. Because this approach provides the requisite information for identifying redundancies during initial attachment, a control node 10 can avoid having more than one communication module 14 from the same remote device 16 from attaching to the same access point 18, or can initiate handover quickly after attachment, to enforce connection diversity.

In other instances, at least some of the communication modules 14 may be configured to report the remote device identifiers of their affiliated remote devices 16 either automatically or upon request. Such communication modules 14 may provide the identifier information during network attachment, possibly through the use of a new system parameter. Such a parameter can be signaled e.g. in an Attach Request message, and optionally also in a Tracking Area Update Request or a Service Request message.

Interesting further considerations involve how the multiple communication modules 14 belonging to a given remote device 16 are used by the remote device 16. In a "proactive" approach, the remote device 16 uses both or all its communication modules 14 to support active communications. In an alternate approach, referred to as a "reactive" approach, the remote device 16 makes connections with all its communication modules 14 but treats one or fewer than all of them as "primary" modules and the remaining ones as "backup" or "failover" modules. Dummy data or other mechanisms may be used to keep the radio links alive for any communication modules 14 used in a backup role.

In one or more embodiments, the control node 10 does not differentiate between proactive or reactive cases and does not otherwise detect, recognize, or use priorities or preferences when controlling handovers of communication modules 14 belonging to the same remote device 16. However, in at least one embodiment, the control node 10 prioritizes the communication modules 14 belonging to the same remote device 16. For example, assume a reactive scenario involving a given remote device 16 that includes first and second communication modules 14-1, 14-2, where the first communication module 14-1 operates as the primary module for the remote device 16 and the second communication module 14-2 operates as a backup for the primary module.

In at least one embodiment, the control node 10 prioritizes the communication module 14-1 over the communication module 14-2. For example, whenever there is some discretion in which one of the communication modules 14 is handed over, the handover may be performed on the second communication module 14-2, to reduce the number of handover events experienced by the first communication module 14-1. Other prioritization schemes may be used, e.g., the first module that connects first has a higher priority than any later-connecting module from the same remote device 16. Other examples base prioritization on current radio link qualities, or historical performance, such as observed traffic activity or volumes, experienced RLFs, etc., on a comparative basis for any two or more communication modules 14 identified as belonging to the same remote device 16.

FIGS. 9-12 illustrate various signaling flows corresponding to example embodiments or scenarios. In the figures, the labels "UE1" and "UE2" denote first and second communication modules 14-1 and 14-2, the labels "BS1" and "BS2" denote first and second access points 18-1 and 18-2, and the labels "MME1" and "MME2" denote first and second Mobility Management Entities respectively associated with BS1 and BS2.

The illustration assumes that the control node functionality described above resides locally at least within BS1 and that the UE1 and the UE2 belong to the same remote device 16 (not shown in the diagram). Further assumptions are that the context information provided to BS1 in association with UE1 and UE2 attaching to it includes affiliation information. In one example, the MMEs provide context information that includes the remote device identifier of the remote device 16 to which the attaching UE belongs.

In Steps 1-4, the UE1 attempts to attached to the BS1, which results in Context Setup Request signaling going between the BS1 and the MME1, and Radio Resource Control (RRC) signaling going between the UE1 and the BS1. Notably, the context information received by the BS1 in Step 4 includes the remote device identifier of the remote device 16 to which the UE1 belongs. Steps 5-8 capture similar operations but involve the UE2 attaching to the BS1.

At Step 9, the BS1 recognizes that both the UE1 and the UE2 are affiliated with the same remote device 16, based on receiving the same remote device identifier for both UEs in the corresponding context information received from the MMEs. The BS1 receives a measurement report from the UE2 at Step 10 and uses the measurement report to determine that BS2 is a candidate for serving the UE2. The BS1 also determines, possibly in cooperation with the BS2, that the BS2 is not already connected with another UE belonging to the same remote device 16 that the UE2 belongs to. If qualifier holds, the BS1 initiates handover (HO) of the UE2 from the BS1 to the BS2, and various path-switch signaling follows the HO execution (see Steps 11-14). As a variation, the BS1 may obtain the remote device identifier from the UE1 and the UE2 directly, as part of the signaling sent by them during the initial attachment request or the subsequent RRC signaling.

Having identified the UE1 and the UE2 as being belonging to the same remote device 16, the BS1 in one or more embodiments propagates that information to the BS2, which may store it locally for use in handover control operations. Additionally, or as an alternative, the BS1 may report the information to another node, e.g., a supervisory node 66, which may then store such information for later distribution to other BSs in the network 12.

Figure 10:
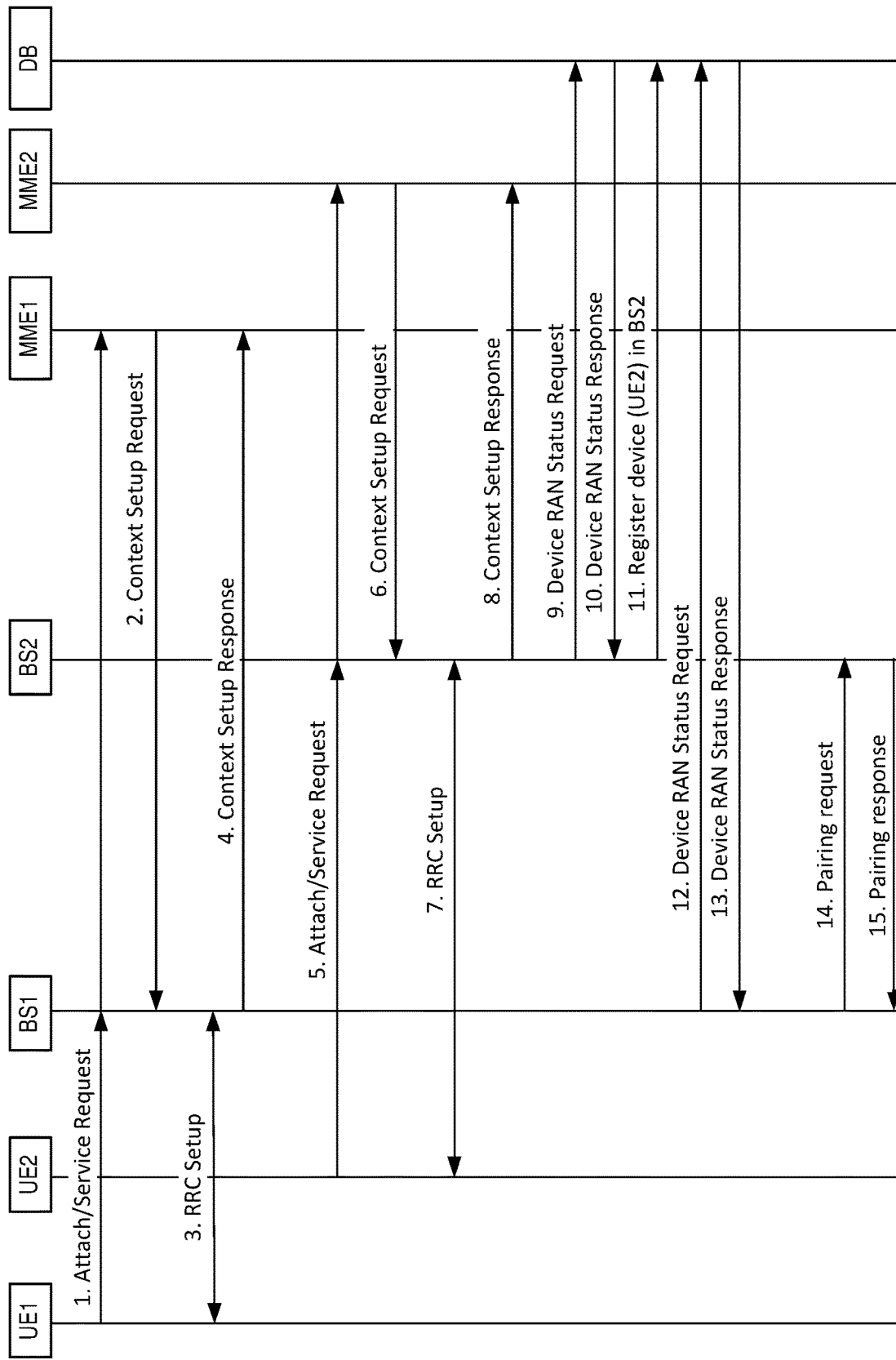

The same or similar exchange of "pairing information" between BSs may occur even when two paired UEs make their initial connections to different BSs in the network 12. Here, "paired" UEs are two UEs that belong to the same remote device 16, i.e., to UEs that are redundant with respect to each other. FIG. 10 illustrates an example signaling flow in such a scenario. Most of the steps are the same or similar to those described for FIG. 9 but see Steps 14 and 15, wherein the BS1 sends a pairing request to the BS2, and the BS2 provides a pairing response in return. The pairing request in one embodiment comprises a request for communication and remote device identifier information known to the BS2, and the pairing response includes such information. The pairing request may carry communication and remote device identifier information known to the BS1, or the BS2 may make a separate request toward the BS1. In another alternative, the pairing request includes one or more remote device identifiers and the corresponding communication module identifiers, e.g., for the most recently connected communication module 14 or modules 14. The BS2 responds by reporting back any communication module identifiers for any communication modules 14 that it knows are affiliated with the remote device identifiers included in the request.

These operations reflect one or more of the options contemplated herein for building affiliation databases 60, which also may be referred to as pairing databases to denote the fact that the information identifies communication modules 14 that are paired with the same remote devices 16. Pairing information may be built up via coordination between the BSs and/or through the assistance of one or more other types of network nodes, such as the MMEs seen in FIGS. 9-12. Pairing information also may be provisioned in or built up in a central database. FIG. 10 illustrates such as the database, labeled "DB" in the figure. Steps 9, 10, 12, and 13 indicate signaling operations where the BS1 and the BS2 query the database for pairing information and/or register the attaching UEs in the database.

Still further, as seen in FIG. 5, there may be local databases 64 used by the BSs (access points 18), along with a central database 68 that can be accessed for building up the local databases 64. Conversely, if the central database 68 is not provisioned with affiliation information, it can be populated over time, based on the network 12 identifying redundancies between communication modules 14 that connect to the network 12.

The information exchange between BSs can be started immediately after a UE is attached. This approach minimizes the time it takes to build up pairing information, which offers advantages in the context of UEs of highly mobile UEs, e.g., UEs embedded in intelligent vehicles. Similarly, pairing information may be built up based on coordination between MMEs or other control plane entities in the network 12. If the same MME handles two UEs, the pairing identification can be made immediately. Further, respective MMEs can exchange information so that pairing can be recognized even when different MMEs handle two UEs.

The MME level coordination can be combined with the BS coordination. For example, BSs may "page" each other in association with ongoing UE attachments, to quickly identify paired UEs. If this BS level paging process in unsuccessful, e.g., a given UE is not identified as having any other paired UE, MME-based coordination and pairing may be used. Optionally, a timer can be defined for the BS level "paging" process, and if the timer expires with unsuccessful UE pairing, then the BSs can send a request to their MME(s) for continuing the pairing process on the MME level. As another variation or alternative, a BS may wait a defined period after a UE attaches to it. If the BS does not receive pairing information for the UE before the expiry of the defined period, it requests that one or more MMEs attempt to determine pairing information for the UE.

Further, as noted, BSs may build up a central database, such as depicted in FIG. 10, based on reporting pairing information, or at least based on reporting communication module identifiers and remote device identifiers for connecting UEs. The central database may have processing intelligence associated with, e.g., to recognize when two or more reported communication module identifiers have the same remote device identifier. In an example of such operation, a BS queries the central database for a UE connecting to the BS and the central database reports back pairing information for the UE. Further, if the UE is not already represented in the database, the UE is registered in the database.

Figure 11:
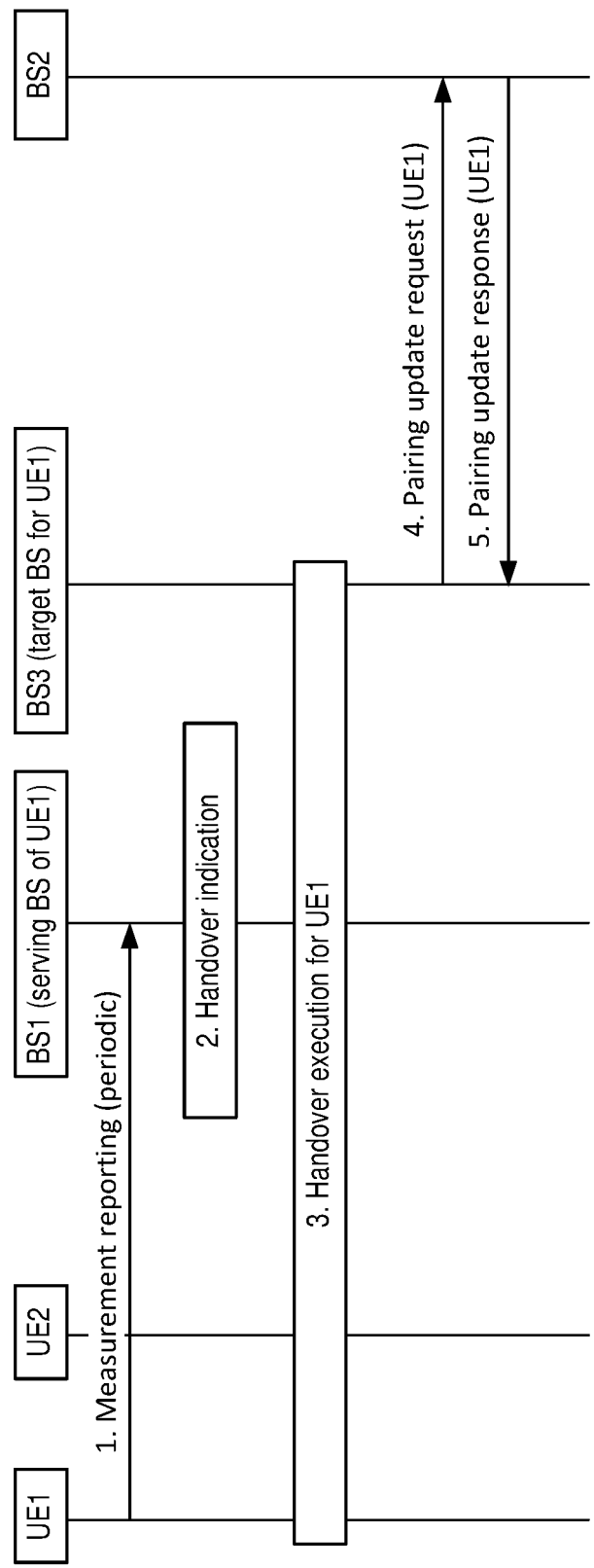

FIG. 11 illustrates further example signaling for determining pairing information, where the diagram assumes that a given remote device 16 (not shown) includes two UEs, UE1 and UE2, which are connected to BS1 and BS2 respectively. The signaling flow further assumes that UE1 is starting a handover from BS1 to BS3. In Step 1, the UE1 sends a measurement report to the BS1 and, based on the measurement report, in Step 2 the BS1 decides about the handover of UE1, considering the available pairing information. Because the other UE (UE2) is connected to the BS2, handover to BS3 instead of BS2 preserves connection redundancy. In Step 3, the handover is executed, and this process transfers the pairing information stored in the BS1 for UE1 and UE2 to the BS3. The BS3 sends a pairing information message to the BS2 to update BS2's knowledge regarding the location of the UE1. In Step 5, the BS2 sends a response message, resulting in the BS2 and BS3 having synchronized pairing information.

The above-described procedure is suitable in general, but it may happen that the UE1 and the UE2 perform parallel handovers. The problem of parallel handovers is solved in one or more embodiments herein by statically configuring the order in which UEs belonging to the same remote device 16 can start a handover. One or more other embodiments use handover coordination.

Figure 12:
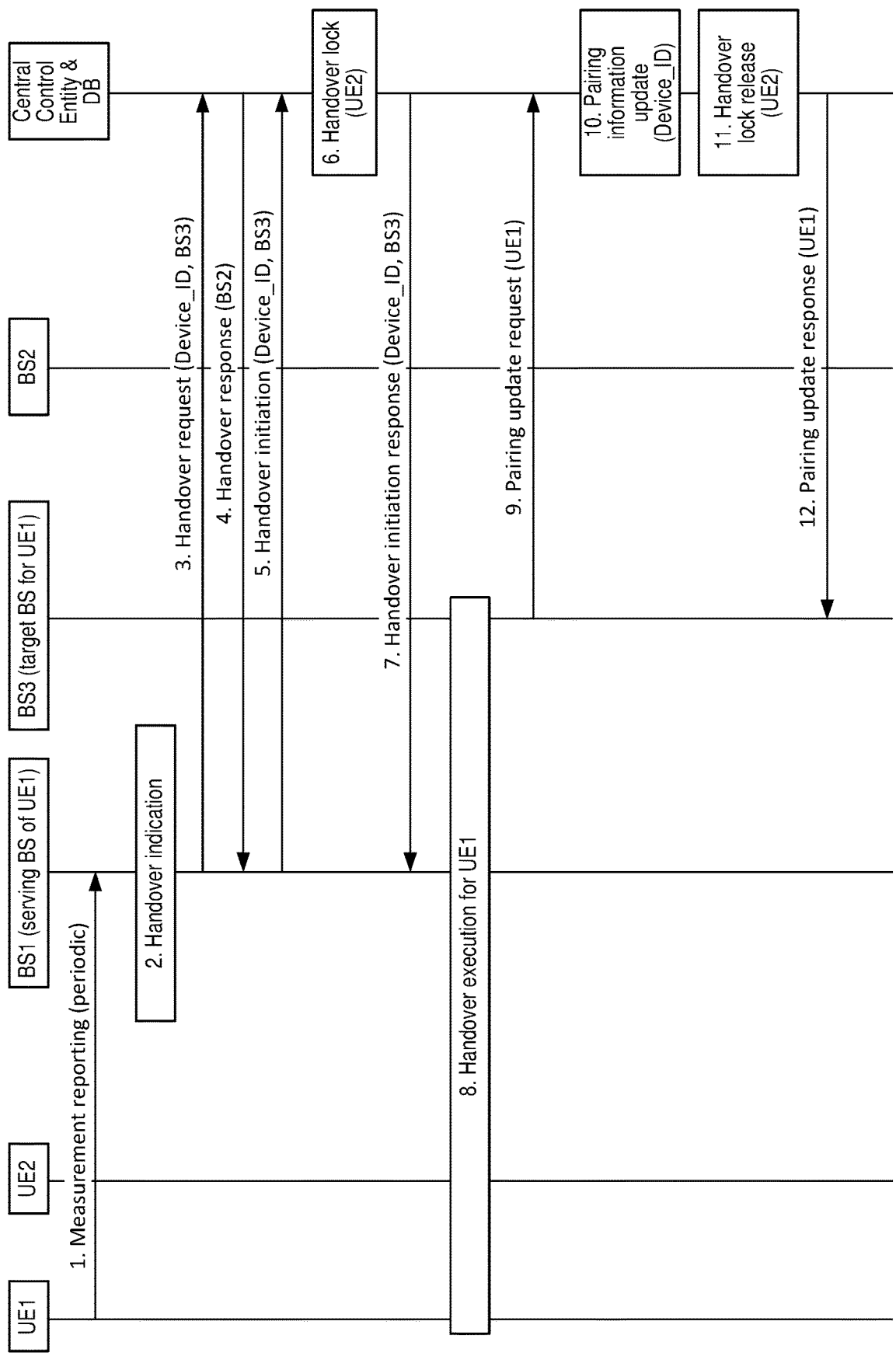

FIG. 12 illustrates an example signaling flow in an embodiment involving a central database and an associated central control entity, e.g., the CN-based supervisory node 66 illustrated in FIG. 5. Based on a UE provided measurement report, in Step 2 the BS1 decides to initiate a handover of the UE1. The BS1 sends a handover request to the central control entity, where the request indicates the communication module identifier of the UE1 and/or the remote device identifier affiliated with the UE1.

In one embodiment, the request is generic in the sense that the central control entity responds with an identification of all BSs that should be avoided. Alternatively, the central control entity knows neighbor relations for the BSs and reports back only for BSs that are neighboring to the requesting BS. In yet another alternative, the requesting BS indicates which BSs are candidates for being a handover target, and the central control entity returns a response indicating which ones of the candidate base stations should be avoided. Here, it will be understood that the central control entity determines which ones of the candidate BSs are connected to UEs that are affiliated with the same remote device 16 as the UE involved in the handover.

In the illustrated example, the label "Device_ID" denotes the remote device identifier and one sees at step 3 that the BS1 sends a request to the central control entity that identifies BS3 as the desired target for the handover. The central control entity responds by indicating that BS2 should be avoided.

Further, to avoid the parallel handovers of UEs belonging to the same remote device 16, the central control entity in one or more embodiments is configured to perform a temporary handover lock for UE2. If the serving BS of the UE2 attempts a handover of the UE2 while the handover lock is active, the central control entity can indicate the lock status or indicate that it should otherwise wait or defer handover of the UE2. Alternatively, the serving BS may be told which BSs to avoid, which would include any BSs involved in ongoing handovers with UEs that belong to the same remote device 16 as the UE2. Once handover of the UE1 completes, the central control entity releases the handover lock on the UE2 and provides the BS3 with updated pairing information.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation at a control node configured for operation in a wireless communication network, the method comprising:
    identifying redundancies between communication modules, wherein a given communication module is considered to be redundant with respect to another given communication module when both given communication modules are identified as being affiliated with a same remote device; and
    controlling handover of communication modules to avoid having communication modules that are redundant with respect to each other connected to a same access point in the network, including at least one of:
        initiating a handover of one communication module in a given pair of communication modules from a given access point to another given access point, in response to determining that the given pair of communication modules are redundant with respect to each other; and
        selecting a given access point as a handover target for a given communication module, based on determining that the given access point is a candidate for serving the given communication module and further based on determining that the given access point is not already serving another given communication module that is redundant with respect to the given communication module.

2. The method of claim 1, wherein controlling handover of communication modules further comprises, after handover of a given communication module from a given access point to another given access point and while the given communication module remains connected to the other given access point, preventing or delaying subsequent handover to the other given access point of any communication module that is redundant with respect to the given communication module.

3. The method of claim 1, wherein a first communication module is identified as being redundant with respect to a second communication module, and wherein controlling handover of communication modules comprises, for the first and second communication modules, avoiding handing over one of the first and second communication modules to any access point that is connected to the other one of the first and second communication modules, provided that handover is not needed to avoid or recover from a radio link failure.

4. The method of claim 1, wherein communication module identifiers identify corresponding communication modules and remote device identifiers identify corresponding remote devices, and wherein identifying redundancies between communication modules comprises recognizing when two or more communication module identifiers are affiliated with the same remote device identifier.

5. The method of claim 4, wherein identifying redundancies between communication modules comprises, for first and second communication modules, obtaining the corresponding communication module identifiers and determining whether the corresponding communication module identifiers are affiliated with the same remote device identifier.

6. The method of claim 5, further comprising obtaining the corresponding communication module identifiers directly or indirectly from the first and second communication modules, and obtaining affiliation information from an affiliation database that indicates whether the corresponding communication module identifiers are affiliated with the same remote device identifier.

7. The method of claim 1, further comprising maintaining an affiliation database indicating affiliations between respective communication modules and respective remote devices.

8. The method of claim 7, wherein maintaining the affiliation database comprises at least one of:
    maintaining one or more local affiliation databases, each local affiliation database being local to a particular access point in the network or a particular group of neighboring access points in the network; and
    maintaining a central affiliation database that is not local to any particular access point in the network or any particular group of access points in the network.

9. A control node configured for operation in a wireless communication network, the control node comprising:
    communication circuitry configured for at least one of: communicating with communication modules that wirelessly connect to the network, communicating with one or more access points that provide for wireless connection to the network, and communicating with one or more other nodes in the network; and
    processing circuitry operatively associated with the communication circuitry and configured to:
    identify redundancies between communication modules, wherein a given communication module is considered to be redundant with respect to another given communication module when both given communication modules are affiliated with a same remote device; and
    control handover of communication modules to avoid having communication modules that are redundant with respect to each other connected to a same access point in the network;
    said processing circuitry configured to control handover based on being configured to perform at least one of:
        initiate a handover of one communication module in a given pair of communication modules from a given access point to another given access point, in response to determining that the given pair of communication modules are redundant with respect to each other; and select a given access point as a handover target for a given communication module, based on determining that the given access point is a candidate for serving the given communication module and further based on determining that the given access point is not already serving another given communication module that is redundant with respect to the given communication module.

10. The control node of claim 9, wherein the processing circuitry is configured to control handover of communication modules by being configured to, after handover of a given communication module from a given access point to another given access point and while the given communication module remains connected to the other given access point, prevent or delay subsequent handover to the other given access point of any communication module that is redundant with respect to the given communication module.

11. The control node of claim 9, wherein, with respect to a first communication module identified as being redundant with respect to a second communication module, the processing circuitry is configured to avoid handing over one of the first and second communication modules to any access point that is connected to the other one of the first and second communication modules, provided that handover is not needed to avoid or recover from a radio link failure.

12. The control node of any of claim 9, wherein communication module identifiers identify corresponding communication modules and remote device identifiers identify corresponding remote devices, and wherein the processing circuitry is configured to identify redundancies between communication modules by being configured to recognize when two or more communication module identifiers are affiliated with a same remote device identifier.

13. The control node of claim 12, wherein the processing circuitry is configured to identify redundancies between first and second communication modules by being configured to obtain the corresponding communication module identifiers and determine whether the corresponding communication module identifiers are affiliated with a same remote device identifier.

14. The control node of claim 13, wherein the processing circuitry is configured to obtain the corresponding communication module identifiers directly or indirectly from the first and second communication modules, and obtain affiliation information from an affiliation database that indicates whether the corresponding communication module identifiers are affiliated with the same remote device identifier.

15. The control node of claim 9, wherein the processing circuitry is configured to maintain an affiliation database indicating affiliations between respective communication modules and respective remote devices.

16. The control node of claim 15, wherein the processing circuitry is configured to maintain the affiliation database by being configured to maintain at least one of:

one or more local affiliation databases, each local affiliation database being local to a particular access point in the network or a particular group of neighboring access points in the network; and a central affiliation database that is not local to any particular access point in the network or any particular group of access points in the network.

17. The control node of claim 9, wherein the control node comprises a Radio Access Network based node that is integrated into or associated with one or more access points in the network.

18. The control node of claim 17, wherein the control node further comprises a Core Network based node that is configured to operate in a supervisory capacity with respect to the RAN based node.

19. The control node of claim 18, wherein the RAN based node maintains the one or more local affiliation databases based on communication module identifiers received from given communication modules connecting to the one or more access points in the network, and further based on affiliation information for obtained from the central affiliation database for the connecting communication modules.

20. A computer program product comprising computer instructions that, when executed by processing circuitry of a control node configured for operation in a wireless communication network, cause the control node to:

communicate with at least one of: communication modules that wirelessly connect to the network; one or more access points that provide for wireless connection to the network; and one or more other nodes in the network;

identify redundancies between communication modules, wherein a given communication module is considered to be redundant with respect to another given communication module when both given communication modules are affiliated with a same remote device; and control handover of communication modules to avoid having communication modules that are redundant with respect to each other connected to a same access point in the network, based on performing at least one of:

initiating a handover of one communication module in a given pair of communication modules from a given access point to another given access point, in response to determining that the given pair of communication modules are redundant with respect to each other; and selecting a given access point as a handover target for a given communication module, based on determining that the given access point is a candidate for serving the given communication module and further based on determining that the given access point is not already serving another given communication module that is redundant with respect to the given communication module.

* * * * *